(12) United States Patent
Van Etten (10) Patent No.: US 6,530,675 B1
(45) Date of Patent: Mar. 11, 2003

(54) EXTERIOR LIGHTING SYSTEMS

(76) Inventor: Kurt B. Van Etten, 37617 N. Cave Creek Rd., Cave Creek, AZ (US) 85331

( * ) Notice: Subject to any disclaimer, the term of this patent is extended or adjusted under 35 U.S.C. 154(b) by 0 days.

(21) Appl. No.: 09/560,302

(22) Filed: Apr. 27, 2000

(51) Int. Cl.[7] .............................................. F21V 29/00
(52) U.S. Cl. ...................... 362/267; 362/153.1; 362/310
(58) Field of Search .............................. 362/153.1, 310, 362/267, 431, 374, 375

(56) References Cited

U.S. PATENT DOCUMENTS

| | | | | |
|---|---|---|---|---|
| 3,836,767 A | * | 9/1974 | Lasker ...................... | 362/153.1 |
| 4,438,484 A | * | 3/1984 | Winden ....................... | 362/267 |
| 5,105,347 A | * | 4/1992 | Roud et al. ................. | 362/268 |
| 5,649,760 A | * | 7/1997 | Beadle ........................ | 362/270 |

* cited by examiner

Primary Examiner—Sandra O'Shea
Assistant Examiner—Ali Alavi (74) Attorney, Agent, or Firm—Martin L. Stoneman (57) ABSTRACT

Several matching exterior lighting systems for use on property having electrical service wiring. Lighting fixtures are made of pipe or wood, preferably PVC pipe or redwood. Several embodiments can be installed directly in the ground, while other embodiments can be installed on the vertical exterior surface of a building, or on the top of a wall. In all embodiments, the lamp and electrical connections are housed within the same enclosure, and no separate electrical box is needed. The embodiments made of pipe are coated with stucco, brick, stone, tile, wood, aluminum sheet, or copper sheet, to protect the pipe from environmental degradation. The preferred coating is stucco, and the invention includes a new method of applying stucco to a circular cylinder and manufacturing an article. All embodiments have elongated rectangular windows parallel both to the florescent light bulb, and to the axis of the cylinder, with translucent lenses to allow light to escape. The circular embodiments each have a single lens that covers all of the windows. In several embodiments, the florescent light and light bulbs can be accessed by removing the top of the light and lifting out the lamp which is hung from the top.

32 Claims, 6 Drawing Sheets

EXTERIOR LIGHTING SYSTEMS

BACKGROUND OF THE INVENTION

1. Field of the Invention

This invention relates to systems for providing exterior lighting on real property. More specifically, this invention concerns systems for lighting the exterior of buildings and the surrounding property, including multi-family dwellings such as apartment buildings.

2. Description of the Background and Prior Art

Typically, in the prior art, some method of lighting the property surrounding buildings was needed at night. Light was needed for occupants, business invitees, and social guests to see their way into and out of the buildings, and also including light for people to perform work, socially interact, recreate, relax, and perform other legitimate activities outdoors, at night, weather permitting. Lighting the property surrounding buildings also was needed to prevent burglars and other criminals from using the cover of darkness to sneak around or hide illicit activities.

Since electrical service became available on a widespread basis, electrical lighting has been used to light property, particularly the property surrounding buildings. See, for example, U.S. Pat. No. 1,248,688 to Ludescher. The development of exterior lighting has continued over the years and has included lights mounted on various-size poles (see, e.g., U.S. Pat. No. 3,257,496 to Hamilton), lights mounted close to the ground (see, e.g., U.S. Pat. No. 3,798,438 to Manechetti), lights mounted on fences (see, e.g., U.S. Pat. No. 1,794,467 to Lucas and U.S. Pat. No. 3,679,891 to Quack), and lights installed along a driveway (see U.S. Pat. No. 5,683,170 to Blaha). Various methods of mounting exterior lighting have been developed, including embedding in concrete (see U.S. Pat. No. 3,364,635 to Guggemos), bolting to a concrete surface (see e.g. U.S. Pat. No. 4,519,657 to Jensen), and direct burial in soil (see U.S. Pat. No. 4,774,648 to Kakuk et al.).

Exterior lighting fixtures have been typically complex, difficult to install, and vulnerable to damage from vandals (see, for example, U.S. Pat. No. 3,257,496 to Hamilton). Exposed glass globes and light bulbs have been particularly susceptible to breakage and spray painting with graffiti. Parts such as globes and reflectors have been typically custom, and replacements have typically had to come from the original manufacturer in order to maintain the original appearance of the lighting fixture. Thus, if the original manufacturer went out of business or changed product lines, when a few lighting fixtures on a property became damaged, it was often necessary to replace all of the lighting fixtures in order to maintain a uniform appearance. In addition, most lighting fixtures were equipped with a unique surface finish provided by the manufacturer. Thus, it was not possible to simply paint over graffiti like a property owner might do with the surface of a building. Rather, the owner often had to either clean off the graffiti or replace the light fixture.

OBJECTS OF THE INVENTION

A primary object of the present invention is to fulfill the above mentioned needs by the provision of an improved system for lighting property having electrical service, particularly property surrounding buildings. Specifically, an object and feature of the invention is to provide a system for efficiently lighting the exterior of buildings wherein the system can be fabricated from commonly available materials so that the original cost of manufacture is minimized and customized designs are feasible and inexpensive. Another object and feature of the invention, using commonly available materials, is that replacement parts for the system can be easily fabricated without necessarily relying on the original manufacturer. Another object and feature of the present invention is that the materials of manufacture be of a type commonly used in building construction so that personnel skilled in the maintenance of buildings will be readily able to maintain and repair the exterior lighting system without the investment involved in learning new skills.

Still another object and feature of the present invention is that it be easy to install, even directly in soil, and that installation require minimal additional parts and conditions. Other objects and features of the present invention include that it resist environmental degradation, including corrosion and ultraviolet damage, that it match the texture and color of surrounding buildings, and that it be safe to use with electricity, preferably being substantially non-conductive. Further objects and features of the present invention include that it be strong, sturdy, resist damage from vandalism, and be easily repairable when damaged, including covering or removing graffiti. Even further objects and features of the present invention include that it be easy to maintain, including the replacing of light bulbs and other electrical components. A still further object and feature of the present invention is that it be aesthetically appealing and that variations matching in appearance be able to be installed in various places on a property including in soil, on poles, on the side of buildings, along driveways, and on walls. Still even further objects and features of the invention are that it be inexpensive, easy to manufacture, convenient to ship, and easy to assemble.

Another object and feature of the present invention is to provide a method of manufacturing an article comprised of a stucco-coated circular cylinder. Objects and features of this method include that it provide a strong bond that is resistant to environmental degradation including extreme temperature changes, and wherein the coated cylinder can be cut into complex geometries without disturbing the bond. Other objects and features of the method include that it be inexpensive, and that it provide a pleasing appearance. Other objects and features of the invention will become apparent with reference to the following invention descriptions.

SUMMARY OF THE INVENTION

According to a preferred embodiment of the present invention, this invention provides an exterior lighting system for use on property having electrical service wiring comprising in combination: an enclosure means for enclosing an electric lamp of the type having at least one light bulb and electrical connections for attaching the electrical service wiring, wherein such enclosure means comprises a unitary hollow right cylinder and at least one substantially-planar end-seal means for sealing an end of such enclosure means; a window means, comprising at least one opening, for allowing light from the electric lamp to escape from such enclosure means; an access means for servicing the electric lamp and replacing the light bulb; a weatherproofing means for preventing water and dirt from entering such enclosure through such window means. And it provides such a system further comprising a covering means for covering such enclosure means in such manner as to resist environmental degradation and promote aesthetic appeal; and, also, further comprising a mounting means for mounting such enclosure means directly in soil.

Additionally, this invention provides such a system wherein such access means comprises: such end-seal means; and a hanger attached at a first hanger end to such end-seal means and attachable at a second hanger end to the electric lamp; and, further, wherein such covering means comprises a material selected from the group consisting of stucco, brick, stone, tile, copper sheet, aluminum sheet, and wood. And it also provides such a system wherein such window means comprises at least one elongated rectangular window; and, further, wherein such weatherproofing means comprises a light-transmitting material covering an inside opening of such window; and, further, wherein such light-transmitting material comprises substantially a thin cylindrical body which fits within and is held by such unitary hollow right cylinder.

Moreover, according to a preferred embodiment thereof, this invention provides an exterior lighting system for use on property having electrical service wiring comprising in combination: at least one electric lamp structured and arranged to receive at least one light bulb and having electrical connections for attaching the electrical service wiring, a body comprising a single hollow clean cylinder having a longitudinal axis, a top end and a bottom end, wherein such body encloses both such electric lamp and such electrical connections, and wherein such bottom end of such cylinder is structured and arranged to extend substantially below the ground surface; and, further, wherein such top end comprises a transparent end piece. And it provides such a system further comprising a reflector, wherein such exterior lighting system is structured and arranged so that such reflector reflects light emitted by such electric lamp through such end piece; and, further, wherein such reflector is user-pivotable to reflect light in different directions.

In addition, it provides such a system wherein such cylinder comprises at least two light-transmitting windows situated in a row around such cylinder, wherein such windows are essentially rectangular, having two long sides and two short sides, and wherein such long sides are essentially parallel to such axis of such cylinder; and, further, wherein such electric lamp is a florescent-type lamp structured and arranged to receive at least one florescent-type light bulb that is essentially the same length as such long side of such windows, and wherein such exterior lighting system is structured and arranged so that when the light bulb is installed it will be located adjacent to and parallel with such long sides of such windows. And it provides such a system further comprising: an end piece structured an arranged to attach to such top end of such cylindrical body; a bracket having a top end and a bottom end, wherein such top end of such bracket is attached to such end piece, such bottom end of such bracket is attached to such electric lamp, and wherein such end piece, such bracket, and such lamp are structured and arranged to be raised through such cylinder as a unit; and, also, further comprising a spiral coil of wire wherein such coil of wire has a first end and a second end, such first end of such coil of wire attaches to such electric lamp, such second end of such coil of wire is structured and arranged to attach to such electrical service wiring, and such coil of wire is structured and arranged to fit concentrically within such cylinder.

Moreover, it provides such a system wherein such cylinder is approximately 60-inches long and approximately 6-inches wide, wherein such row of such windows is located just below such top end of such cylinder; and, further, wherein such cylinder is essentially a right square cylinder; and, also, wherein such cylinder comprises essentially redwood; and, also, wherein such cylinder is essentially a right circular cylinder; and, further, wherein such cylinder comprises essentially PVC pipe; and, further, wherein such cylinder is essentially covered with a material selected from the group consisting of stucco, brick, stone, tile, copper sheet, aluminum sheet, and wood. And it provides such a system having one row of such windows wherein such row of such windows is located just below such top end of such cylinder; and, further, wherein such cylindrical body is comprised of approximately 6-inch nominal diameter plastic pipe. And it also provides such a system further comprising a second such row of such windows spaced beneath such (first) such row of such windows; and, further, wherein such cylindrical body is comprised of approximately 3-inch nominal diameter plastic pipe and wherein such electric lamp is a low voltage lamp; and, also, further comprising a second such electric lamp adjacent such second row of such windows.

Even further, according to a preferred embodiment thereof, this invention provided an exterior lighting system for use on property having electrical service wiring comprising in combination: at least one electric lamp structured and arranged to receive at least one light bulb, and having electrical connections for attaching the electrical service wiring; a body essentially comprised of part of a right circular hollow cylinder wherein such body has an axis, an exterior surface, and at least one end, and such body encloses both such electric lamp and such electrical connections; a coating covering at least a substantial portion of such exterior surface of such body, wherein such coating essentially comprises a material selected from the group consisting of: stucco, brick, stone, tile, copper sheet, aluminum sheet, and wood; and wherein such body comprises at least one window. And it provides such a system wherein such window further comprises a lens, and such window is substantially elongated in a direction essentially parallel to such axis of such body; and, also, wherein such window is rectangular; and, further, wherein such body comprises essentially a right circular cylinder; and, also, wherein such lens comprises a right incomplete circular cylinder of translucent material and wherein one such lens covers at least two such windows.

Still additionally, this invention provides such a system wherein such body is structured and arranged for mounting on an essentially flat essentially horizontal surface and wherein such axis of such body is essentially vertical. And it provides such a system further comprising a reflector. It also provides such a system wherein such body further comprises a half circular cylinder, two such ends, and a backing plate, and such body is structured and arranged for mounting on an essentially flat essentially vertical surface; and, also, wherein such lamp is a florescent lamp; and, also, wherein such body is structured and arranged to be mounted with such axis of such body essentially horizontal; and, further, wherein such lighting system comprises two electric lamps; and, also, wherein such body is structured and arranged to be mounted with such axis of such body essentially vertical, and such body comprises at least two windows; and, also, wherein such body comprises a circular cylinder, such end of such body comprises essentially a lens, and such end is mounted at an angle with respect to such axis of such body wherein such angle is between 30 and 75 degrees.

Even moreover, this invention provides, in accordance with a preferred embodiment thereof, a method of manufacturing an exterior-lighting article comprised of a stucco-coated hollow circular cylinder, comprising in combination the steps of: wrapping a such circular cylinder with screen; applying stucco to such screen; allowing such stucco to cure; saw cutting such stucco coated such cylinder to a user-desired conformation; and painting such stucco; and, also, wherein such desired conformation comprises rectangular openings.

DETAILED DESCRIPTION OF A PREFERRED EMBODIMENT AND THE BEST MODE OF PRACTICE

Figures 1, 2, 3:
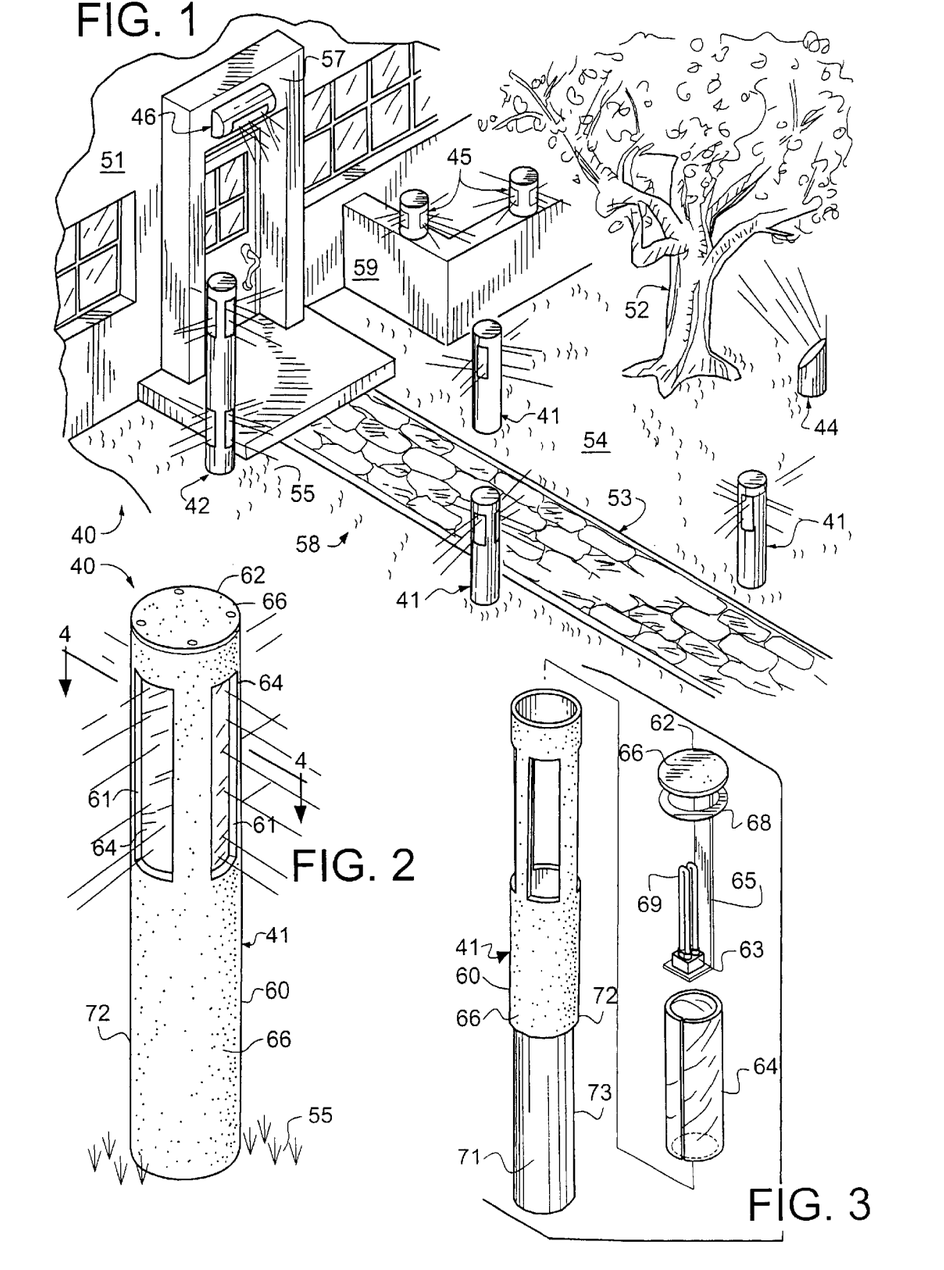
FIG. 1 is a perspective view illustrating five different preferred embodiments of the exterior lighting system installed and lighting the property next to a building.
FIG. 2 is a perspective view of a column light installed in a lawn.
FIG. 3 is an exploded perspective view illustrating a column light and showing the electric lamp, top end, hanger, and lens.

FIG. 1 is a perspective view illustrating five different preferred embodiments of the exterior lighting system 40 installed, typically, for lighting the property 58 next to a building 51. The embodiments of exterior lighting system 40 that are shown are column light 41, pole light 42, flood light 44, wall top light 45, and horizontal wall mounted light 46. Column light 41 and pole light 42 are suitable for general illumination of any property 58, particularly that property 58 surrounding a building 51. Column light 41 is shown in a typical application, illuminating a walkway 53, and pole light 42 is shown in another typical application, illuminating a door to a building 51. Flood light 44 is typically used to shine light on particular above-ground-level 54 objects such as a tree 52 (as shown) or the exterior of a building 51. Wall top light 45 is typically mounted on a wall 59 and used to illuminate the property 58 near a wall 59. As shown, wall 59 is short and located next to building 51; however, wall top light could also be used on a higher wall 59, and could be used far from a building 51. Horizontal wall mounted light 46 is shown mounted on the exterior wall surface 57 of a building 51, and illuminates the property 58 next to the building 51.

FIG. 2 is a perspective view of a column light 41 installed in a lawn 55. Column light 41 preferably has four peripherally-spaced elongated rectangular windows 61 (two shown) in cylindrical body 60, this arrangement embodying herein that such window means comprises at least one elongated rectangular window. Column light 41 also embodies herein that such cylinder comprises at least two light-transmitting windows situated in a row around such cylinder, wherein such windows are essentially rectangular, having two long sides and two short sides, and wherein such long sides are essentially parallel to such axis of such cylinder. Also, this window arrangement, as shown embodies herein that such row of such windows is located just below such top end of such cylinder. The visible electromagnetic radiation (light) that column light 41 emits escapes through the windows 61. The body 60 of column light 41 preferably has a flat top end 62 as shown, and the body 60 and top end 62 are shown coated with a preferred coating material, stucco 66. Top end 62 embodies herein a substantially-planar end-seal means.

FIG. 3 is an exploded perspective view illustrating a column light 41 and showing the electric lamp 63, top end 62, hanger 65, and lens 64. Electric lamp 63 is preferably of the type designed for outdoor use and to operate on 110-volt 60-cycle alternating current as is predominantly available in the United States of America. To provide the greatest amount of visible light for the amount of electricity consumed (greatest efficiency), electric Lamp 63 is preferably of the florescent type, and is fitted with an appropriate number of suitable light bulbs 69. Electric lamp 63 is preferably attached to hanger 65, which is preferably attached to top end 62. Thus, in the preferred embodiment of column light 41, top end 62, hanger 65, and lamp 63 can be removed as a unit to access lamp 63, such as to replace light bulbs 69. As shown, this arrangement with bulbs 69 embodies herein such electric lamp is a florescent-type lamp structured and arranged to receive at least one florescent-type light bulb that is essentially the same length as such long side of such windows, and wherein such exterior lighting system is structured and arranged so that when the light bulb is installed it will be located adjacent to and parallel with such long sides of such windows. Lens 64 is preferably one piece of translucent material that has been rolled into an incomplete cylinder of slightly less than 360° as shown, and mounted to cover (from the inside) all of windows 61; and this arrangement embodies herein that such weatherproofing means comprises a light-transmitting material covering an inside opening of such window. Lens 64 can be easily removed (if needed) from body 60 once top end 62 is removed. Column light 41 (and the bodies of several of the other within embodiments) are preferably constructed from polyvinyl chloride (PVC) pipe 71 of the type widely available for domestic and commercial use. PVC pipe 71 is preferably type PSM PVC gravity sewer pipe meeting ASTM standard D 3034 and having a tensile strength of 6000 psi under ASTM test D 638. PVC pipe 71 used with column light 41 is preferably 6-inch nominal diameter, with an actual outside diameter of 6.275-inches and a minimum wall thickness of 0.241-inches. As will be described in more detail below, column light 41 is preferably constructed to be installed with a portion of the body 60 embedded in the ground 54 (below grade). The below-grade portion 73 of body 60 of column light 41 is preferably not coated, while the above-grade portion of column light 41 is preferably coated, and is shown in FIG. 3 coated with stucco 66.

The below-grade portion 73 of column light 41 is preferably about 18 inches long. The above-grade portion 72 of column light 41 can be many different sizes, all preferably equal to the standard widths of window screen 94 (see the description of FIG. 8 below). For typical installations, applicant's preferred length for the above-grade portion 72 of column light 41 is about 42 inches. Thus, a preferred overall length of PVC pipe 71 for column light 41 is 60 inches. PVC pipe 71 embodies herein, as shown, a unitary hollow right cylinder. The enclosure portions of column light 41 embody herein an enclosure means for enclosing an electric lamp of the type having at least one light bulb and electrical connections for attaching the electrical service wiring, wherein such enclosure means comprises a unitary hollow right cylinder and at least one substantially-planar end-seal means for sealing an end of such enclosure means. Column light 41 can also be made of smaller (preferably 3-inch nominal diameter) PVC pipe 71, preferably of similar proportion to the larger 6-inch diameter version described above. This smaller version of column light 41 is preferably equipped with low voltage lamp 63 (not shown) and used to illuminate a driveway (not shown) or walkway 53 (as depicted in FIG. 1). The length of the above-grade portion of this smaller, driveway version, of column light 41 is preferably 24 inches.

Figure 4:
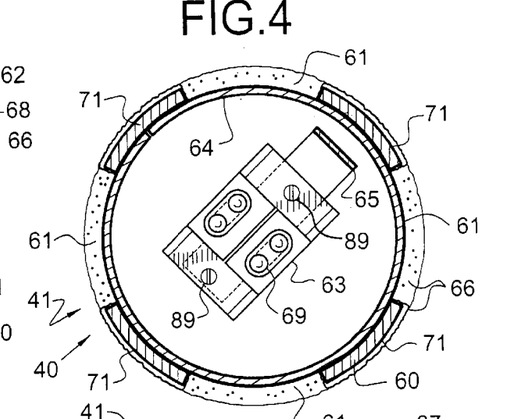
FIG. 4 is a sectional top view of the window portion of a column light illustrating how the lamp is installed in the cylinder.
Figure 5:
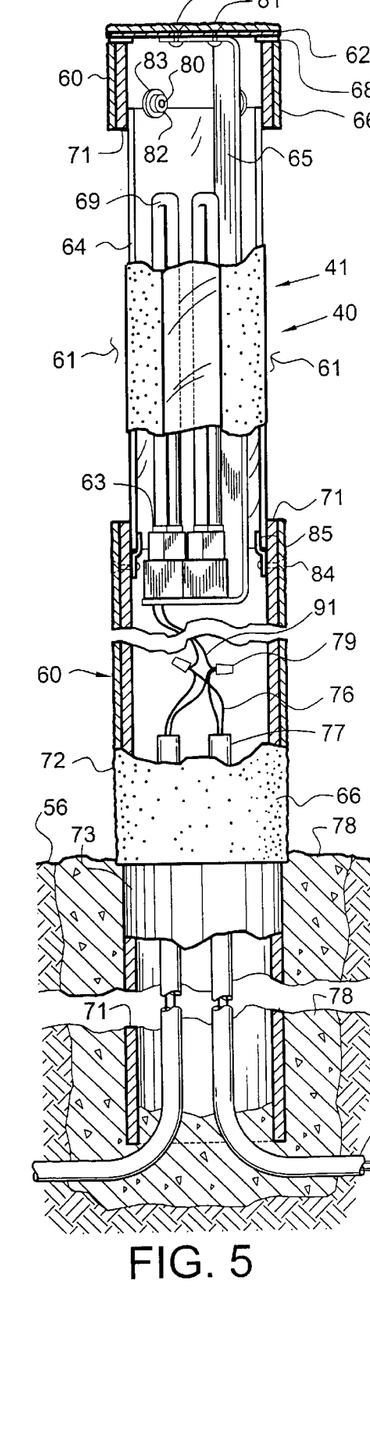
FIG. 5 is a side view, partially in section, of the column light illustrating how the various components of the column light fit together and how the column light is structured and installed and connected to the electrical service wiring.
Figure 6:
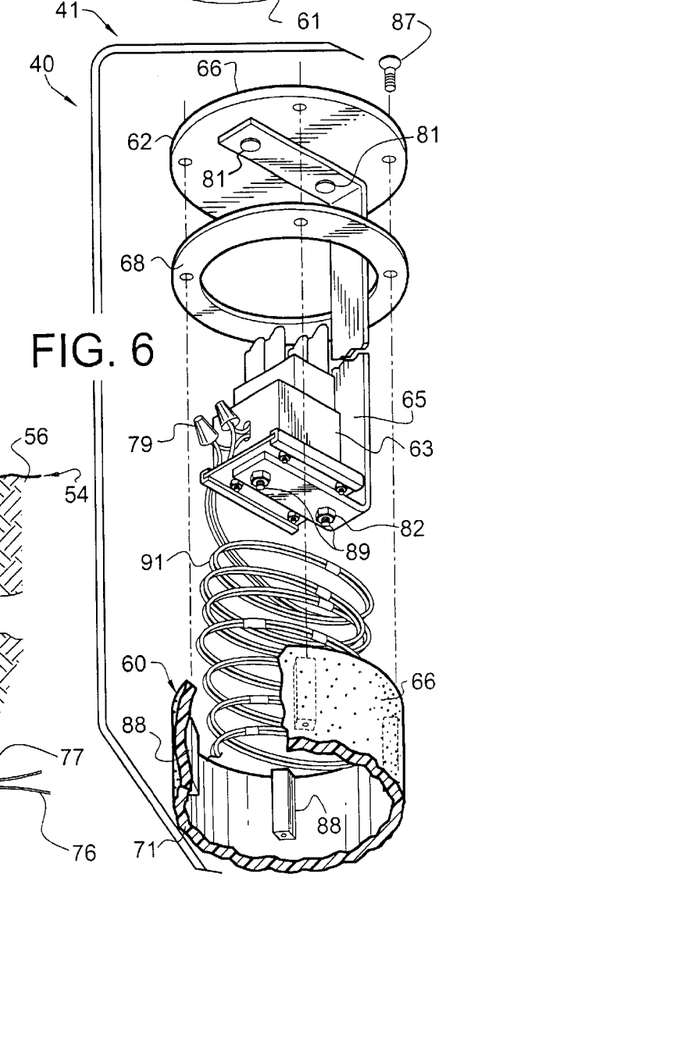
FIG. 6 is an exploded partial perspective view of the top portion of the column light showing how the electric lamp and top end are structured and installed.

FIG. 4 is a sectional top view of the above-grade portion 72 of a column light 41 through the windows 61 illustrating how the lamp 63 is installed in the body 60. FIG. 5 is a side view, partially in section, of the column light 41, illustrating how the various components of the column light 41 fit together and how the column light 41 is installed and connected to the electrical service wiring. FIG. 6 is an exploded partial perspective view of the top portion of the column light 41 showing how the electric lamp 63 and top end 62 are installed. As can be seen in these figures, lamp 63 preferably attaches to hanger 65 with two screws 89 with nuts 82, as shown. Hanger 65 preferably attaches to top end 62 with two fasteners 81, as shown. Top end 62 (embodying herein an end piece structured an arranged to attach to such top end of such cylindrical body) is preferably a round piece of galvanized-steel sheet metal, preferably about $\frac{1}{16}$-inch thick, with a coating applied externally, such as stucco 66 as shown. Fasteners 81 are not typically disassembled for maintenance or other purposes, and so can be rivets. Screws, with or without nuts, would also work; however, rivets are preferred for fasteners 81. Top end 62 preferably attaches to body 60 with four screws 87, which are preferably of a type suitable to attach to plastic. Screws 87 preferably attach to four blocks 88, which are plastic, preferably PVC, and are glued to PVC pipe 71 of body 60 with a suitable adhesive readily selectable by a person of ordinary skill in the art of fabricating articles from plastic. Blocks 88 (best shown in FIG. 6) contain holes of a diameter suitable for screws 87. Gasket 68 fits between top end 62 and body 60, and preferably has four holes for screws 87. Gasket 68 preferably keeps water and dust out of exterior lighting system 40 which could damage lamp 63 or the various electrical connections. Gasket 68 is preferably made of a soft rubber material such a neoprene that remains pliable for a long time.

When top end 62 is installed on body 60, light bulbs 69 are located directly behind windows 61 so that the greatest amount of light possible is emitted through the windows 61 (embodying herein a window means, comprising at least one opening, for allowing light from the electric lamp to escape from the enclosure means). When top end 62 is installed on body 61, hanger 65 is preferably located between two windows 61 (see FIG. 4) so that hanger 65 does not cast a shadow on one of the windows 61. As described above and shown best in FIG. 4, one lens 64 preferably covers all four windows 61 on the inside of PVC pipe 71. Lens 64 forms an incomplete cylinder, and, as shown best in FIG. 4, lens 64 is preferably installed so that the gap is hidden between two windows 61. As shown best in FIG. 5, lens 64 is preferably supported by four clips 85 which are secured in place (to body 60) by fasteners 84. Fasteners 84 are similar to fasteners 81 described above. Also, as shown best in FIG. 5, lens 64 is secured on the top to body 60 by four screws 80 with nuts 82 and fender washers 83. Clips 85 and fender washers 83 keep lens 64 from being pushed in when a force is applied on the exterior of lens 64. Light bulbs 69 can easily be replaced in column light 41 by removing screws 87 and lifting up top end 62, along with hanger 65 and lamp 63, this arrangement embodying herein an access means for servicing the electric lamp and replacing the light bulb. Also, this arrangement with hanger 65 embodies herein a bracket having a top end and a bottom end, wherein such top end of such bracket is attached to such end piece, such bottom end of such bracket is attached to such electric lamp, and wherein such end piece, such bracket, and such lamp are structured and arranged to be raised through such cylinder as a unit. Lens 64 can easily be replaced by removing top end 62 as just described, removing nuts 82 and fender washers 83, compressing and lifting out the old lens 64, and rolling up and installing the new lens 64 into clips 85. Fender washers 83 and nuts 82 can then be re-installed.

Lens 64 is preferably a polycarbonate sheet of a thickness conducive to bending to the desired PVC pipe 71 diameter. Lens 64 must be translucent (able to pass light), but need not be transparent (able to see through). However, a transparent material will work, and may be most efficient at transmitting light. Lens 64 (embodying herein that such light-transmitting material comprises substantially a thin cylindrical body which fits within and is held by such unitary hollow right cylinder) performs several functions, including protecting light bulbs 69 and lamp 63 from various forms of environmental damage, e.g., from the elements and from vandals. Lens 64 keeps water out from rain or sprinklers, and keeps dust out, particularly in dusty climates such as in Phoenix, Ariz., and the surrounding areas. It is desirable to keep water out because it may short out or otherwise damage lamp 63 or the electrical connections. Lens 64 may not exclude all water, but any water that does get in will harmlessly run down the inside of PVC pipe 71 to the ground 54. It is desirable to keep dust out because it coats light bulbs 69 and the back side of lens 64 and reduces the transmission of light. This described arrangement of lens 64 embodies herein a weatherproofing means for preventing water and dirt from entering such enclosure through such window means. Fasteners 81 and 84 are essentially permanent, and the stucco (or other coating as described below) is preferably either applied after fasteners 81 and 84 are installed, or the coating is repaired after fasteners 81 and 82 are installed. Similarly, the stucco can be repaired or applied over screws 80, and future lens 64 replacement can be accomplished by removing nuts 82 but not disturbing screws 80.

Figure 10:
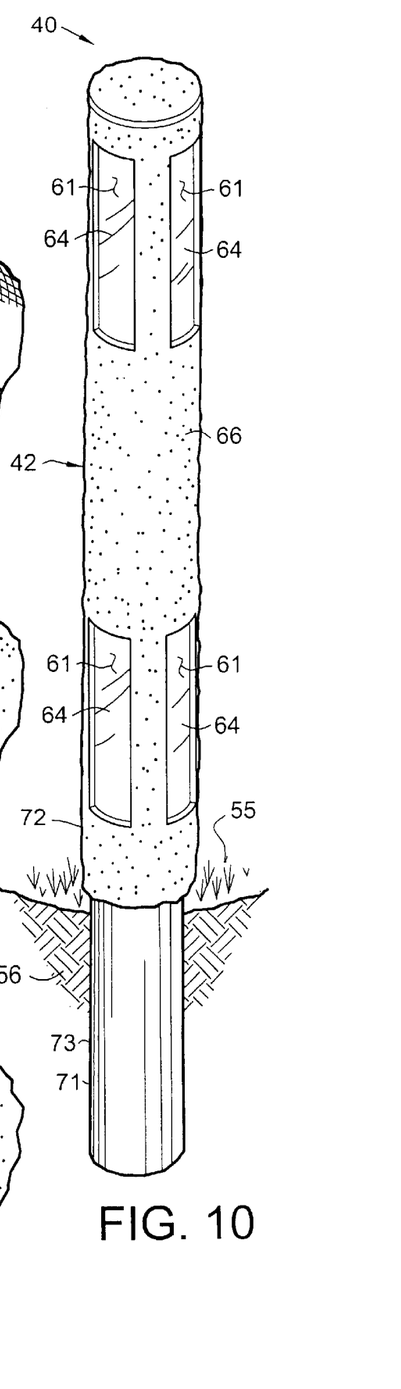
FIG. 10 is a perspective view of the pole light embodiment of the exterior lighting system showing how several embodiments of the present invention can be installed directly in soil.

FIG. 5 shows a preferred mode of installing column light 41 in the ground 54. As described above, the below-grade portion 73 of the PVC pipe 71 forming the body 60 of column light 41 is preferably left uncoated (i.e., no stucco 66). Electrical service wiring 76 is preferably installed above grade, either in conduit 77 (preferably, as shown) or without conduit (direct burial—not shown). Column lights 41 may be installed in the same trench (not shown) that is dug to install the electrical service wiring 76. If the electrical service wiring 76 is lower than the bottom of body 60, then the electrical service wiring 76, and conduit 77 if provided, is preferably routed up through the bottom end of PVC pipe 71 as shown. If the electrical service wiring 76 is above the bottom of body 60, then the bottom of body 60 (PVC pipe 71) can be notched or drilled as convenient using tools and methods well known to a person of ordinary skill in the art. The underground service wiring 76 is preferably connected to a coil 91 of wire, which is connected to lamp 63 with more wire nuts 79. Coil 91 is preferably slightly smaller in diameter than the inside of PVC pipe 71, and fits inside body 60 below lamp 63. Coil 91 preferably allows lamp 63 to be lifted out and reinstalled without disturbing the connections secured by wire nuts 79. Coil 91 also prevents the wiring from getting above lamp 63 and casting a shadow on lens 64. As shown, coil 91 embodies herein a spiral coil of wire wherein such coil of wire has a first end and a second end, such first end of such coil of wire attaches to such electric lamp, such second end of such coil of wire is structured and arranged to attach to such electrical service wiring, and such coil of wire is structured and arranged to fit concentrically within such cylinder. Below-grade portion 73 of PVC pipe 71 can be installed directly in soil 56 (as shown in FIG. 10); however, the best mode is to place about 50 to 100 pounds of concrete 78 around the below-grade portion of column light 41 as shown in FIG. 5. Concrete 78 helps to stabilize column light 41 to prevent it from being tipped out of plumb if someone pushes on it. This arrangement with below-grade portion 73 embodies herein a mounting means for mounting such enclosure means directly in soil. Although not shown, it is preferable that at least a portion of the bottom of PVC pipe 71 contact soil 56 so that any water that gets inside PVC pipe 71 can sink into the ground 54. Column light 41 should preferably be installed plumb and in a manner familiar to a person of ordinary skill in the art of installing poles and posts.

The other embodiments of exterior lighting system 40 are similar to column light 41, except as described otherwise herein, or shown otherwise on the drawings. The described arrangement of pipe 71 embodies herein a body comprising a single hollow clean cylinder having a longitudinal axis, a top end and a bottom end, wherein such body encloses both such electric lamp and such electrical connections, and wherein such bottom end of such cylinder is structured and arranged to extend substantially below the ground surface. The language "clean" in "clean cylinder" as used herein means without external protrusions, flanges, or other such extensions which would substantially interfere with the external cylindrical shape.

Column light 41 can also be constructed from steel pipe (not illustrated) rather than PVC pipe 71, and used as an anti-vehicle barrier as well as a light. In such an application, to prevent column light 41 from being forced out of the ground by the impact of a vehicle, below-grade portion 73 would preferably be longer, and more concrete 78 would preferably be used. Although not illustrated herein, in such an application it would also be advantageous to fill body 60 with concrete to just below the bottom of lamp 63 to prevent the bottom part of column light 41 from buckling when impacted by a vehicle. Column light 41 would have the same coating (for example, stucco 66), and therefore the same appearance if steel pipe were used rather than PVC pipe 71.

Figures 7, 8, 9:
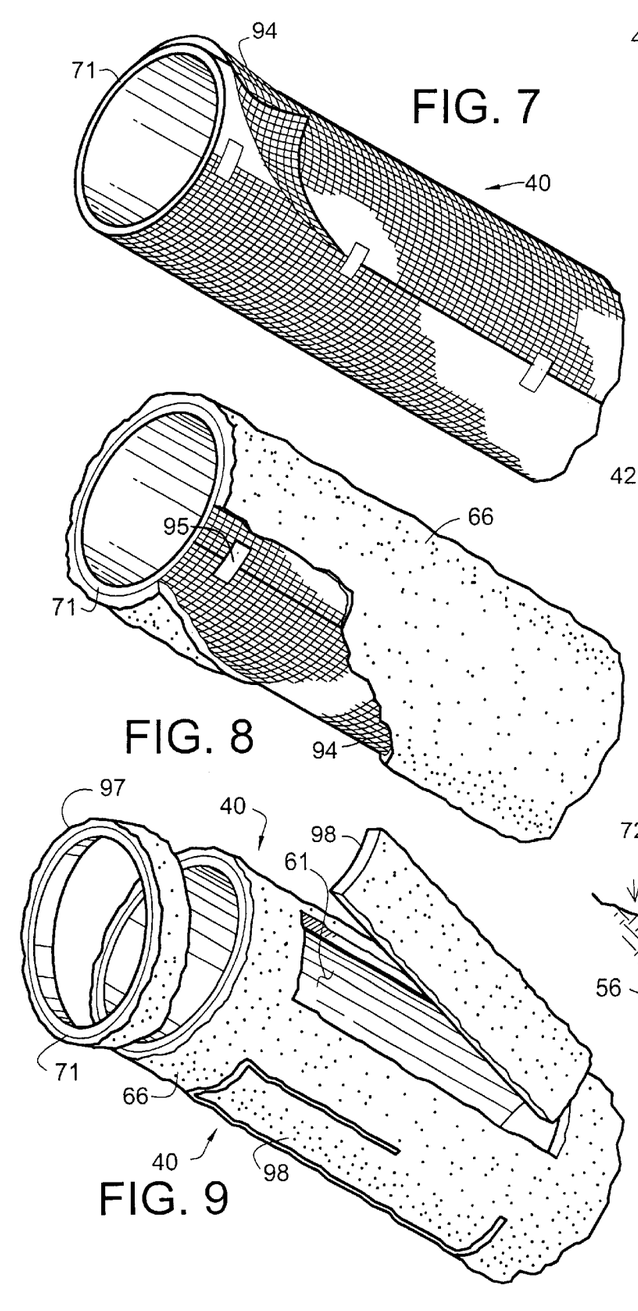
FIG. 7 is a partial perspective view of a preferred embodiment of the exterior lighting system showing how screening is structured and installed prior to applying stucco.
FIG. 8 is a partial perspective view of the preferred embodiment of FIG. 7 of the exterior lighting system showing how stucco is structured and applied after installing the screen.
FIG. 9 is a partial perspective view of the preferred embodiment of FIGS. 7 and 8 of the exterior lighting system showing how the stucco-coated pipe may be cut to a desired geometry after the stucco is applied.

FIG. 7 is a partial perspective view of a preferred embodiment of the exterior lighting system 40 showing how screen 94 is installed prior to applying stucco 66. FIG. 8 is a partial perspective view showing how stucco 66 is applied after installing screen 94. FIG. 9 shows how the stucco-coated PVC pipe 71 is cut to the desired geometry after the stucco 66 is applied. The first step in such installation is to make sure that the outside surface of PVC pipe 71 is clean. Then, as illustrated in FIG. 7, screen 94 is wrapped around PVC pipe 71 as shown, and held in place with tape 95. Screen 94 is preferably standard fiberglass window screen of the type commonly used to keep flying insects from entering an open window of a building. Screen 94 preferably comes on a roll, and has a width equal to the height of the above-grade portion 72 (see FIG. 3) of the exterior lighting system 40 being manufactured. Screen 94 is preferably cut so that it overlaps about an inch, as shown. Next, as shown in FIG. 8, stucco 66 is applied over screen 94, covering screen 94 and tape 95. Then exterior lighting system is set aside for stucco 66 to cure. Stucco 66 could be a high quality stucco comprised of Portland cement and hydrated lime, such as SUPERIOR EXTERIOR STUCCO, supplied by PARAGON BUILDING PRODUCTS (TM) of 2895 Hammer Ave., Norco, Calif. 91760. However, it is presently preferred to use an elastomeric acrylic fortified polymer coating material, mixed with assorted sizes of calcium carbonate, quartz, and silica sand aggregates, such as PREMIUM STUCCO by HIGHLAND PRODUCTS (TM). This arrangement with stucco 66 embodies herein a covering means for covering such enclosure means in such manner as to resist environmental degradation and promote aesthetic appeal. After stucco 66 cures, PVC pipe 71 is preferably saw cut through stucco 66, as shown in FIG. 9, to the desired shape. As depicted in FIG. 9, typical cuts include: removing a ring 97 from the top to make the end of PVC pipe 71 (with stucco 66) square; and cutting out rectangles 98 to form windows 61.

As mentioned elsewhere in this specification, various components, such as clips 85 and fasteners 84 (see FIG. 5), can be installed prior to applying the stucco 66. Thus, fasteners 84 and the like will be hidden under stucco 66. Alternatively, fasteners 84 and the like can be installed after applying stucco 66, and stucco 66 can be repaired to hide such fasteners as 84. This above-shown method embodies herein a method of manufacturing an exterior-lighting article comprised of a stucco-coated hollow circular cylinder, comprising in combination the steps of: wrapping a such circular cylinder with screen; applying stucco to such screen; allowing such stucco to cure; saw cutting such stucco coated such cylinder to a user-desired conformation; and painting such stucco; and, also, wherein such desired conformation comprises rectangular openings FIG. 10 is a perspective view of a preferred embodiment of the pole light 42 of the exterior lighting system 40, further showing how several embodiments of the present invention can be installed directly in soil. As shown, pole light 42 preferably has two rows of four equal-size windows 61, one row at the top, similar to column light 41 described above, and one row just above ground level 54. Pole light 42 preferably has an above-grade portion 72 that is about 72 inches long and a below-grade portion 73 that is about 18 inches long. Thus, when installed, pole light 42 rises 72 inches above the ground 54, and the total length of PVC pipe 71 is 90 inches. Pole light 42 is preferably made of the same 6-inch nominal diameter PVC pipe 71 as column light 41 described above. Pole light 42 is preferably coated, preferably with the same stucco 66 as described above and shown in FIG. 10. Although FIG. 10 shows pole light 42 installed directly in soil 56, pole light 42 should preferably be installed in the preferred manner described above for column light 41.

Figures 11, 12, 13, 14:
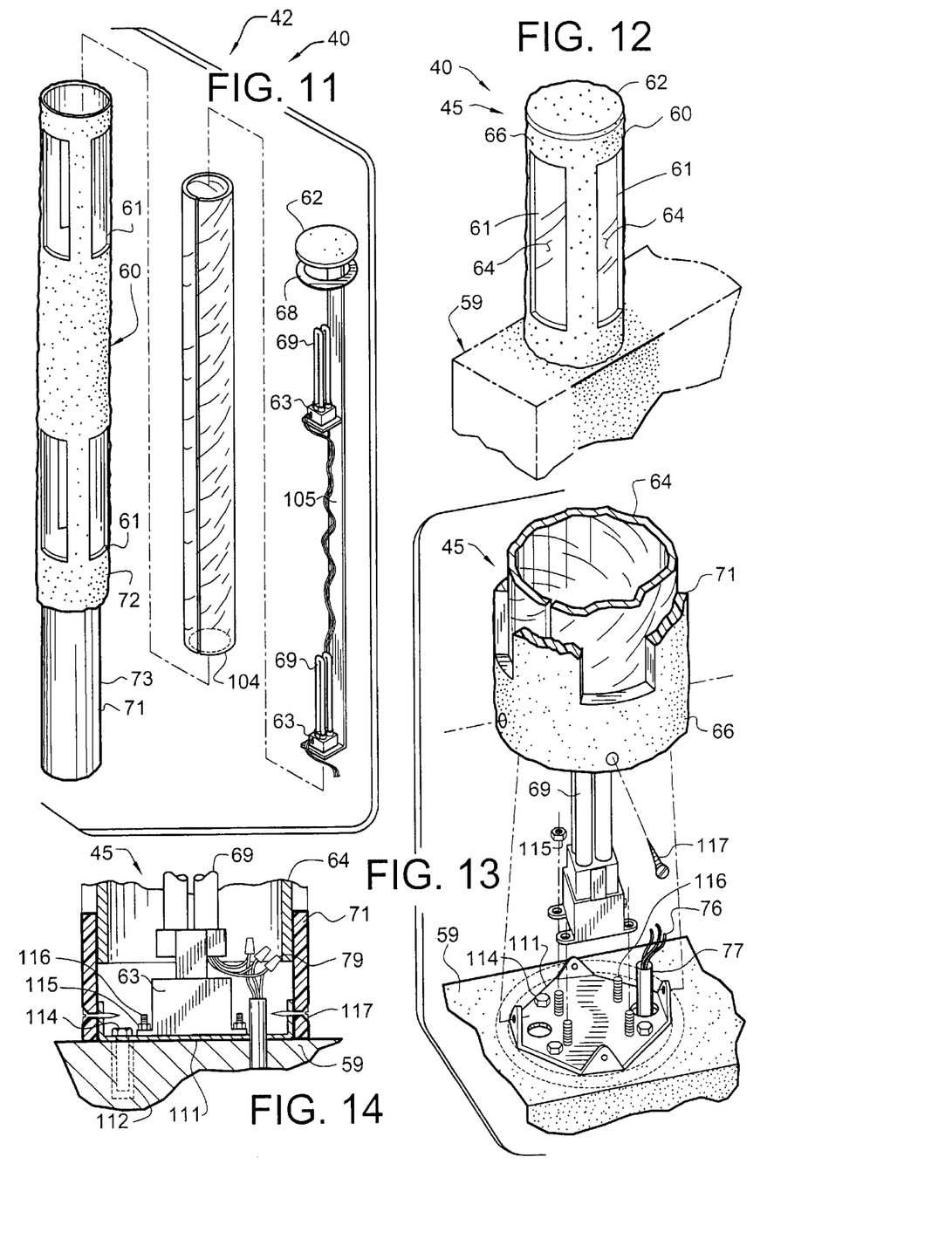
FIG. 11 is an exploded partial perspective view of a pole light illustrating the lens and how the two lamps are hung from the top end.
FIG. 12 is a partial perspective view of the wall top embodiment of the exterior lighting system.
FIG. 13 is an exploded partial perspective view, partially in section, of the wall top embodiment of the exterior lighting system showing how the wall top embodiment is installed.
FIG. 14 is a partial side sectional view of the wall top embodiment of the exterior lighting system showing how the wall top embodiment is installed.

FIG. 11 is an exploded perspective view of a pole light 42 illustrating, for example, the lens 104 and how the two lamps 63 are hung from the top end 62. The internal components of pole light 42 are the same as for column light 41 described above except for the differences noted herein. The main difference is that pole light 42 preferably has two lamps 63 for the two rows of windows 61, one lamp for each window row. Lens 104 is longer to cover both rows of windows, and hanger 105 is longer to support both lamps 63. Pole light 42 has a coil 91 of wire that is not fully shown, but contains more turns than the coil 91 for column light 41, due to the greater height of the body 60. Accessing of the lamps 63 in pole light 42 is the same as for column light 41 described above, except that a ladder may be needed due to the increased height of body 60 and hanger 105.

FIG. 12 is a partial perspective view of the wall top light 45, which is another preferred embodiment of the exterior lighting system 40. FIG. 13 is an exploded partial perspective view of the wall top light 45 showing how it is installed.

FIG. 14 is a partial side sectional view of the wall top light 45, also showing how the wall top light 45 is installed. Wall top light 45 is preferably similar to column light 41 described above, except for the differences described herein and shown in the figures. The most obvious differences, as can be seen best in FIG. 12, are that wall top light 45 is shorter and is mounted on the top of a wall 59 rather than being embedded in the ground 54. As can be seen in FIGS. 13 and 14, wall top light 45 has a base plate 111 that is attached to the top of wall 59 preferably with four expansion anchors 112 and bolts 114. Other fasteners could be used as well, selectable by a person of ordinary skill in the art. Lamp 63 preferably attaches to base plate 111 with studs 116 and nuts 115. PVC pipe 71, preferably forming body 60, preferably attaches to base plate 111 with four sheet metal screws 117 as shown. Thus, to access lamp 63, and light bulbs 69, one would remove the four screws 117 and lift off body 60. Wall top lamp 45 is preferably powered by electrical service wiring 76 in conduit 77, which will have been previously installed in wall 59 preferably as shown. Lamp 63 is preferably connected to electrical service wiring 76 with wire nuts 79. No coil 91 is needed for wall top light 45, which light embodies herein that such body is structured and arranged for mounting on an essentially flat essentially horizontal surface and wherein such axis of such body is essentially vertical.

Figures 15, 16, 17, 18, 19, 20:
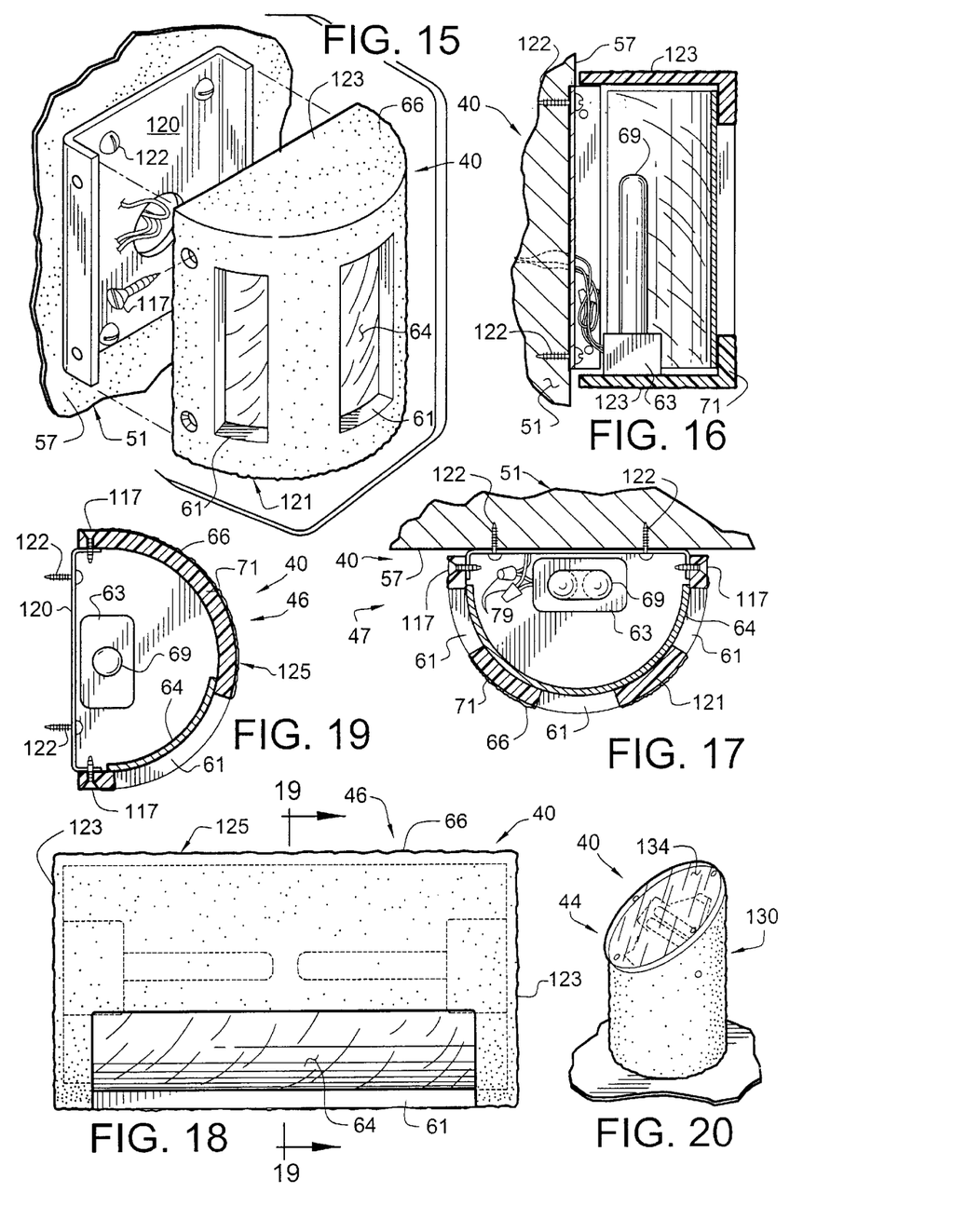
FIG. 15 is an exploded partial perspective view of the vertical wall mount embodiment of the exterior lighting system.
FIG. 16 is a sectional side view of the vertical wall mount embodiment of the exterior lighting system showing how the vertical wall mount light is installed on the surface of a wall.
FIG. 17 is a sectional top view of the vertical wall mount embodiment of the exterior lighting system showing how the vertical wall mount light is installed on the surface of a wall.
FIG. 18 is a front view of the horizontal wall mount embodiment of the exterior lighting system.
FIG. 19 is a sectional side view of the horizontal wall mount embodiment of the exterior lighting system showing how the horizontal wall mount light is installed on the surface of a wall.
FIG. 20 is a perspective view of the flood light embodiment of the exterior lighting system.

FIG. 15 is a partially exploded perspective view of the vertical wall mount light 47 that is another embodiment of the exterior lighting system 40. FIG. 16 is a sectional side view of the vertical wall mount light 47 showing how the vertical wall mount light 47 is installed on a wall surface 57. FIG. 17 is a sectional top view of the vertical wall mount light 47 also showing how the vertical wall mount light is installed on a wall surface 57. Vertical wall mount light 47 preferably attaches to the outside vertical wall surface 57 of a building 51 with fasteners 122. Fasteners 122 are shown to be wood screws, which would be the best choice where wall surface 57 is wood. For other wall surface 57 materials, other fasteners 122 may be preferable, and such fasteners 122 would be readily selectable by a person of ordinary skill in the art of attaching things to wall surfaces 57. Vertical wall mount light 47 preferably has a backing plate 120, which is preferably made of a reflective material, such as steel, so that more light is reflected out windows 61. Vertical wall mount light 47 preferably also comprises body 121, which is made of a half-round section of PVC pipe 71 preferably covered with a coating described herein, such as stucco 66 as shown. Body 121 preferably has three windows 61, which are covered with lens 64 as shown (and similarly to other described embodiments). Body 121 has two ends 123, which are preferably made of plastic or metal sheet attached to body 121 preferably with a suitable adhesive (in ways well known to a person of ordinary skill in the art of manufacturing articles from plastic and metal). Body 121 attaches to backing plate 120 preferably with four screws 117 as shown. Body 121 can be removed by removing screws 117 to access lamp 63 and light bulbs 69. Electrical power is provided as shown and in well-known ways from the wall area where this embodiment is mounted. Light 47 embodies herein that such body further comprises a half circular cylinder, two such ends, and a backing plate, and such body is structured and arranged for mounting on an essentially flat essentially vertical surface.

FIG. 18 is a front view of the horizontal wall mount light 46, which is another embodiment of the exterior lighting system 40. FIG. 19 is a sectional side view of the horizontal wall mount light 46 showing how the horizontal wall mount light is installed on a wall surface 57 of a building 51. Horizontal wall mount light 46 is similar to vertical wall mount light 47 except that it is mounted with the axis of the PVC pipe 71 horizontal rather than vertical. Another difference is that horizontal wall mount light 46 preferably only has one window, preferably on the bottom half so that horizontal wall mount light 46 shines its light primarily downward. Horizontal wall mount light 46 (embodying herein that such body is structured and arranged to be mounted with such axis of such body essentially horizontal) also preferably has two lamps 63 as shown; and electrical service is again providable from the wall area of the mounting.

Figures 21, 22, 23, 24, 25, 26:
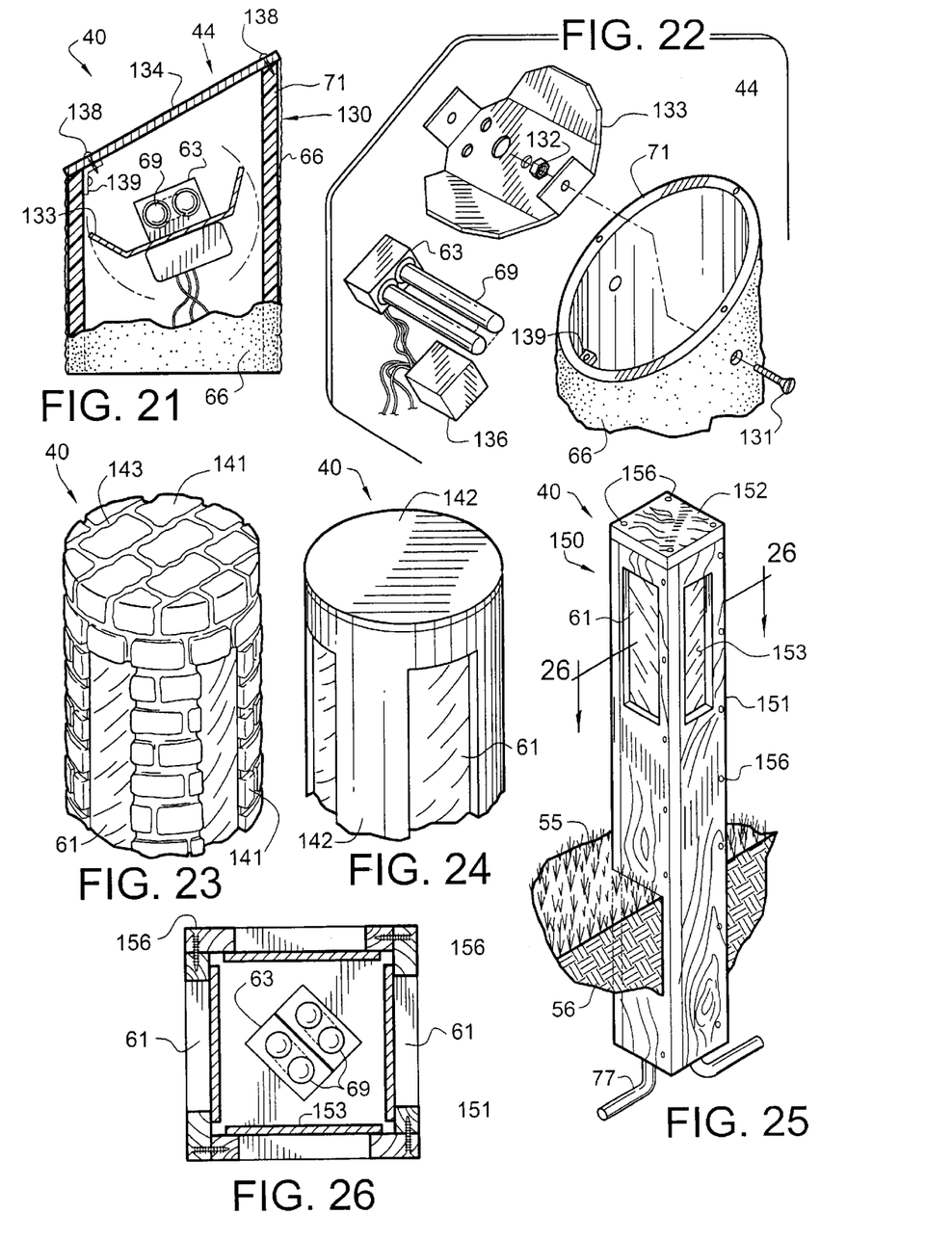
FIG. 21 is a sectional side view of the flood light embodiment of the exterior lighting system showing how the lamp and reflector pivot, and how the lens is installed.
FIG. 22 is an exploded perspective view of the flood light embodiment of the exterior lighting system showing how the lamp and reflector are installed.
FIG. 23 is a partial perspective view of an embodiment of the exterior lighting system showing a brick coating.
FIG. 24 is a partial perspective view of an embodiment of the exterior lighting system showing a metal sheet coating.
FIG. 25 is a perspective view of the redwood embodiment of the exterior lighting system showing how it is installed.
FIG. 26 is a sectional top view of the redwood embodiment of the exterior lighting system showing how it is constructed and the lenses and lamp are installed.

FIG. 20 is a perspective view of a preferred embodiment of flood light 44 of the exterior lighting system 40. FIG. 21 is a sectional side view of the flood light 44 showing how the lamp 63 and reflector 133 pivot, and how the lens 134 is installed. FIG. 22 is an exploded partial perspective view of the flood light 44 showing how the lamp 63 and reflector 133 are installed. Flood light 44 is typically mounted close to the ground 54 and is used to light objects such as buildings 51 or trees 52 (see FIG. 1). Flood light 44 preferably has a lamp 63 with short light bulbs 69 as shown, and a reflector 133. As shown in FIG. 22, lamp 63 preferably has a separate ballast 136. Flood light 44 has a body 130, which is made of PVC pipe 71 as described above for column light 41. PVC pipe 71 is preferably coated with a material described herein, such as stucco 66, as shown in FIGS. 21 and 22 and described above. Although not shown in FIGS. 21 or 22, flood light 44 preferably mounts directly in the soil 56 as shown in FIG. 10. Due to the short stature of flood light 44, concrete 78, as shown in FIG. 5, is not needed. Flood light 44 preferably has lens 134, which is preferably comprised of an elliptical piece of clear transparent polycarbonate. Lens 134 is preferably set at an angle as shown in FIG. 21. Lens 134 is preferably set at an angle of about 30 degrees from horizontal, but could advantageouosly be set at an angle from about 15 degrees to about 60 degrees from horizontal. [In other words, lens 134 could be set at an angle between 30 and 75 degrees from the axis of PVC pipe 71.] PVC pipe 71 is cut at the angle of lens 134, and lens 134 is attached to body 130 with four screws 138. Three of screws 138 preferably screw directly into holes in PVC pipe 71, and one screw 138 screws into bracket 139 as shown. Lamp 63 and ballast 136 preferably attach to reflector 133 as shown in FIG. 21, and reflector 133 preferably attaches to body 130 (PVC pipe 71) with two screws 131 and two nuts 132 as shown in FIG. 22. Thus, reflector 133 can be pivoted along the line through screws 131 to aim the light at the object being illuminated. Light 44 embodies herein that such body comprises a circular cylinder, such end of such body comprises essentially a lens, and such end is mounted at an angle with respect to such axis of such body wherein such angle is between 30 and 75 degrees.

FIG. 23 is a partial perspective view of an embodiment of the exterior lighting system 40 showing a brick coating 141. FIG. 24 is a partial perspective view of an embodiment of the exterior lighting system 40 showing a metal sheet coating 142. When made with PVC pipe 71 or other pipe, exterior lighting system 40 is preferably coated with one of several materials. These materials include stucco 66 (see FIGS. 2 through 22), brick 141 (FIG. 23), aluminum sheet (metal sheet 142, FIG. 1 and FIG. 24) copper sheet (metal sheet 142, FIG. 1 and FIG. 24), stone (not shown), tile (not shown) and wood (not shown). Brick, stone, tile, and wood, are preferably attached to PVC pipe 71 with a suitable adhesive, readily selectable by a person of ordinary skill in the art, and applied over screen 94 as shown in FIG. 7 and described above. Mortar 143 is preferably applied between bricks or stone (see FIG. 23). Mortar 143 is preferably epoxy mortar. For tile, a high quality grout would preferably be applied between the tiles. Metal sheet 142 (e.g., aluminum or copper) is preferably secured with a suitable adhesive also, but screen 94 is preferably not used with metal sheet 142. The coating (stucco 66, brick 141, metal sheet 142, or others described herein) performs the function of protecting PVC pipe 71, or other pipe, from environmental degradation. Where PVC pipe 71 is used, the chief mechanism of environmental degradation is embrittlement and loss of strength due to the harmful effects of ultraviolet light from the sun. Preventing ultraviolet degradation of PVC pipe 71 is particularly important in sunny climates such as in Phoenix, Ariz. Where steel pipe is used (described above), the chief mechanism of environmental degradation is corrosion, particularly in wet climates or where exterior lighting system 40 is installed in a grass 55 lawn that is frequently watered.

FIG. 25 is a perspective view of a preferred embodiment of redwood light 150 of the exterior lighting system 40. FIG. 25 shows how the redwood light 150 is installed. FIG. 26 is a sectional top view of the redwood light 150 showing how it is constructed and the lenses 153 and lamp 63 are installed. Redwood light 150 is preferably comprised of four identical sides 151, as shown, which are preferably each made from 1×8×60 inch redwood boards. The sides are preferably held together with screws 156 as shown, forming a right square cylinder (light 150 embodying herein that such cylinder is essentially a right square cylinder). Screws 156 are preferably drywall screws readily selectable by a person of ordinary skill in the art of carpentry. Each side 151 has an elongated rectangular window 61 as shown, each preferably covered on the inside by a lens 153 as shown. Each lens 153 is preferably a square piece of translucent plexiglass preferably secured to side 151 with a suitable adhesive. Redwood light 150 preferably also has top 152, which is also made of redwood board, and is preferably secured by four screws 156 as shown in FIG. 25. Lamp 63 is preferably attached to end 152 with a hanger 65 (not shown) similar to hanger 65 for column light 41 as shown in FIG. 6 and described above. The connection of lamp 63 in redwood light 150 to electrical service wiring 76 (not shown) is preferably the same as for column light 41 as shown in FIG. 6 and described above. Redwood light 150 can be embedded directly in soil, with or without concrete 78 as shown in FIGS. 5 and 25 and as described above for other embodiments. Although a redwood light similar in size and features to column light 41 is shown on the figures, as can be easily visualized by a person of ordinary skill in the art, such redwood light can be similar in size and features to pole light 42, wall top light 45, vertical wall mount light 47, horizontal wall mount light 46, and flood light 44.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent from the descriptions and the claims.

What is claimed is:

1. An exterior lighting system for use on property having electrical service wiring comprising in combination:
   a) an enclosure means for enclosing an electric lamp of the type having at least one light bulb; and b) electrical connections for attaching the electrical service wiring,
c) wherein said enclosure means comprises
  i) a unitary hollow right cylinder having
    (1) at least a substantial portion essentially circular in cross-section, and
  ii) at least one substantially-planar end-seal means for sealing an end of said enclosure means;
d) a window means, comprising at least one opening, for allowing light from the electric lamp to escape from said enclosure means;
e) an access means for servicing the electric lamp and replacing the light bulb;
f) a weatherproofing means for preventing water and dirt from entering said enclosure through said window means;
g) wherein said access means comprises,
  i) said end-seal means; and
  ii) a hanger attached at a first hanger end to said end-seal means and attachable at a second hanger end to the electric lamp.

2. The exterior lighting system according to claim 1 further comprising:
   a. a covering means for covering said enclosure means in such manner as to resist environmental degradation and promote aesthetic appeal.

3. The exterior lighting system according to claim 1 further comprising:
   a. a mounting means for mounting said enclosure means directly in soil.

4. A method of manufacturing an exterior-lighting article comprised of a stucco-coated hollow circular cylinder, comprising in combination the steps of:
   a. wrapping a said circular cylinder with screen;
   b. applying stucco to said screen;
   c. allowing said stucco to cure;
   d. cutting said stucco coated said cylinder to a user-desired conformation; and
   e. painting said stucco.

5. The exterior lighting system according to claim 2 wherein said covering means comprises a material selected from the group consisting of: stucco, brick, stone, tile, copper sheet, aluminum sheet, and wood.

6. The exterior lighting system according to claim 1 wherein said window means comprises at least one elongated rectangular window.

7. The exterior lighting system according to claim 6 wherein said weatherproofing means comprises a light-transmitting material covering an inside opening of said window.

8. The exterior lighting system according to claim 7 wherein said light-transmitting material comprises substantially a thin cylindrical body which fits within and is held by said unitary hollow right cylinder.

9. An exterior lighting system for use on property having electrical service wiring comprising in combination:
   a) at least one electric lamp structured and arranged to receive at least one light bulb and having electrical connections for attaching the electrical service wiring,
   b) a body comprising a single hollow clean cylinder having a longitudinal axis, a top end and a bottom end, wherein said body encloses both said electric lamp and said electrical connections, and wherein said bottom end of said cylinder is structured and arranged to extend substantially below the ground surface,
   c) an end piece structured and arranged to attach to said top end of said cylindrical body, and
   d) a bracket having a top end and a bottom end, wherein said top end of said bracket is attached to said end piece, said bottom end of said bracket is attached to said electric lamp, and wherein said end piece, said bracket, and said lamp are structured and arranged to be raised through said cylinder as a unit.

10. The exterior lighting system according to claim 9 wherein said top end comprises a transparent end piece.

11. The exterior lighting system according to claim 10 further comprising a reflector, wherein said exterior lighting system is structured and arranged so that said reflector reflects light emitted by said electric lamp through said end piece.

12. The exterior lighting system according to claim 11 wherein said reflector is user-pivotable to reflect light in different directions.

13. The exterior lighting system according to claim 9 wherein said cylinder comprises at least two light-transmitting windows situated in a row around said cylinder, wherein said windows are essentially rectangular, having two long sides and two short sides, and wherein said long sides are essentially parallel to said axis of said cylinder.

14. The exterior lighting system according to claim 13 wherein said electric lamp is a florescent-type lamp structured and arranged to receive at least one florescent-type light bulb that is essentially the same length as said long side of said windows, and wherein said exterior lighting system is structured and arranged so that when the light bulb is installed it will be located adjacent to and parallel with said long sides of said windows.

15. The method according to claim 4 wherein said desired conformation comprises rectangular openings.

16. The exterior lighting system according to claim 9 further comprising a spiral coil of wire wherein said coil of wire has a first end and a second end, said first end of said coil of wire attaches to said electric lamp, said second end of said coil of wire is structured and arranged to attach to said electrical service wiring, and said coil of wire is structured and arranged to fit concentrically within said cylinder.

17. The exterior lighting system according to claim 13 wherein said cylinder is approximately 60-inches long and approximately 6-inches wide, wherein said row of said windows is located just below said top end of said cylinder.

18. The exterior lighting system according to claim 13 wherein said cylinder is essentially a right square cylinder.

19. The exterior lighting system according to claim 18 wherein said cylinder comprises essentially redwood.

20. The exterior lighting system according to claim 13 wherein said cylinder is essentially a right circular cylinder.

21. The exterior lighting system according to claim 20 wherein said cylinder comprises essentially PVC pipe.

22. The exterior lighting system according to claim 20 wherein said cylinder is essentially covered with a material selected from the group consisting of: stucco, brick, stone, tile, copper sheet, aluminum sheet, and wood.

23. The exterior lighting system according to claim 22 having one row of said windows wherein said row of said windows is located just below said top end of said cylinder.

24. The exterior lighting system according to claim 23 wherein said cylindrical body is comprised of approximately 6-inch nominal diameter plastic pipe.

25. The exterior lighting system according to claim 23 further comprising a second said row of said windows spaced beneath said (first) said row of said windows.

26. The exterior lighting system according to claim 9 wherein said cylindrical body is comprised of approximately 3-inch nominal diameter plastic pipe and wherein said electric lamp is a low voltage lamp.

27. The exterior lighting system according to claim 25 further comprising a second said electric lamp adjacent said second row of said windows.

28. An exterior lighting system for use on property having electrical service wiring comprising in combination:
   a) at least one electric lamp structured and arranged to receive at least one light bulb, and having electrical connections for attaching the electrical service wiring;
   b) a body essentially comprised of part of a right circular hollow cylinder wherein said body has an axis, an exterior surface, and at least one end, and said body encloses both said electric lamp and said electrical connections;
   c) a coating covering at least a substantial portion of said exterior surface of said body, wherein said coating essentially comprises a material selected from the group consisting of: stucco, brick, stone, tile, copper sheet, aluminum sheet, and wood; and
   d) wherein said body comprises at least one window;
   e) wherein said window further comprises a lens, and said window is substantially elongated in a direction essentially parallel to said axis of said body;
   f) wherein said window is rectangular;
   g) wherein said body comprises essentially a right circular cylinder; and
   h) wherein said body further comprises a half circular cylinder, two said ends, and a backing plate, and said body is structured and arranged for mounting on an essentially flat essentially vertical surface.

29. The exterior lighting system according to claim 28 wherein said lamp is a florescent lamp.

30. The exterior lighting system according to claim 29 wherein said body is structured and arranged to be mounted with said axis of said body essentially horizontal.

31. The exterior lighting system according to claim 30 wherein said lighting system comprises two electric lamps.

32. The exterior lighting system according to claim 29 wherein said body is structured and arranged to be mounted with said axis of said body essentially vertical, and said body comprises at least two windows.

* * * * *